United States Patent [19]
Gans et al.

[11] Patent Number: 5,201,585
[45] Date of Patent: Apr. 13, 1993

[54] FLUID FILM JOURNAL BEARING WITH SQUEEZE FILM DAMPER FOR TURBOMACHINERY

[75] Inventors: Bruce E. Gans, Beverly, Mass.; John H. Vohr, Schenectady, N.Y.

[73] Assignee: General Electric Company, Schenectady, N.Y.

[21] Appl. No.: 814,900

[22] Filed: Dec. 31, 1991

[51] Int. Cl.⁵ .............................................. F16C 17/02
[52] U.S. Cl. ...................................... 384/99; 384/215
[58] Field of Search ................. 384/99, 215, 116, 118, 384/119, 111

[56] References Cited

U.S. PATENT DOCUMENTS

| | | |
|---|---|---|
| 3,589,782 | 6/1971 | Le Breton . |
| 4,027,931 | 6/1977 | Streifert . |
| 4,460,283 | 7/1984 | Yoshioka et al. .................. 384/119 |
| 4,605,316 | 8/1986 | Utecht ................................... 384/99 |
| 4,947,639 | 8/1990 | Hibner et al. ......................... 384/99 |
| 5,071,262 | 12/1991 | Monzel et al. ....................... 384/99 |

Primary Examiner—Lenard A. Footland
Attorney, Agent, or Firm—Nixon & Vanderhye

[57] ABSTRACT

An improved fluid film bearing having a squeeze film damper tailored to the dynamic vibration characteristics of a turbomachine. Compact cantilevered spring bars support the squeeze film damper and thin fluid film bearing surface against the rotor shaft. The spring bars fit compactly within the bearing. The squeeze film damper includes oil plenums that provide a reservoir of fluid and prevent air from entering the damper and thin fluid film.

13 Claims, 3 Drawing Sheets

FLUID FILM JOURNAL BEARING WITH SQUEEZE FILM DAMPER FOR TURBOMACHINERY

FIELD OF THE INVENTION

This invention relates to bearings and especially to journal bearings for turbomachinery. In particular, this invention pertains to an improved fluid film journal bearing having a squeeze film damper to attenuate vibration.

BACKGROUND AND SUMMARY OF THE INVENTION

Fluid film journal bearings have long been used to dampen the vibration created by turbomachines. Rotors in aircraft gas turbine engines and industrial centrifugal compressors often use squeeze film damper bearings supported by spring bars to reduce the amount of vibration transmitted from the rotor to the supporting structure. In a fluid film bearing, a thin fluid film forms a buffer between the rotating journal surface and the stationary bearing surface, and dampens vibration from the rotor. In a squeeze film damper bearing, a thin film of fluid is squeezed by two non-rotating cylindrical surfaces. One surface is stationary while the other is positioned by a spring bar support structure and oscillates with the motion of the rotor. The squeezing of the fluid film dampens rotor vibration through the bearing support.

Damping the vibration in a turbomachine provides quiet and comfortable operation of the machine, reduced fatigue stress on the machine and its supports, and a safeguard to the damage that can be caused by unstable vibration. Vibration in a turbomachine is usually caused by a rotating mass imbalance, e.g., rotor, or by aerodynamic forces within the turbine and/or compressor. These vibrations are not static, but vary with the operating speed and operating characteristics of the turbomachine. Turbomachine vibration has a dynamic range that varies in magnitude and frequency with the operating speed of the turbomachine. An optimal bearing must have dynamic damping characteristics tailored to the dynamic range of the vibration being applied to the bearing by the turbomachine.

Since two or more bearings are required to support rotating shafts, the bearings must accommodate slight misalignments between the bearing and the rotor. Misalignments can be either angular misalignment, where the axis of rotation of the journal differs from the axial centerline of the bearing, or bearing elevation misalignments on rotors with three or more bearings. It is exceedingly difficult for each of the bearings supporting the turbomachine to be exactly aligned with the rotor. It is especially difficult to align the three or more bearings that support rigidly coupled rotors for combined cycle gas and steam turbines.

Prior art bearings do not accommodate very well the inevitable elevation misalignments between bearings. These prior art bearings become unevenly loaded when there is misalignment with the rotor or other bearings. Misalignments can cause some bearings to bear an excessive load, while other bearings are lightly loaded. An excessive load on a fluid film bearing can reduce the thickness of the oil film to such an extent that the film is inadequate to prevent metal-to-metal contact between the bearing and the journal surface of the rotor. An inadequate oil film can cause exaggerated metal temperatures, extraordinary metal wear and premature failure of the bearing. In addition, the lightly loaded bearings may vibrate with bearing oil whirl which contributes to, rather than dampens, the vibration transmitted from the turbomachine to the bearing support. Accordingly, the inability of prior art bearings to accommodate misalignments is a serious disadvantage of these bearings.

While prior art fluid film bearings are used to dampen vibration, the rigid supports for these bearings limit the dynamic range of vibration that can be attenuated. These prior art bearings are stiff and have a limited ability to dampen vibration. Squeeze film dampers have been applied to fluid film bearings to increase, albeit slightly, the dynamic range of these bearings. To reduce bearing stiffness, spring bar supports have been arranged circumferentially within these bearings to provide additional flex to the bearing. However, prior art spring bars are bulky because of the manner that they are bolted or otherwise attached to the bearing. These bulky spring bars increase the size of the bearing and are typically much larger than a standard fluid film bearing. It has been exceedingly difficult to replace old bearings with bearings having spring bars because of the additional space required for the new bearings.

The current invention is an improved fluid film journal bearing having a squeeze film damper. This bearing has the advantages of prior fluid film bearings with squeeze dampers along with several additional advantages. These additional advantages include a substantial reduction in the transmission of vibration from the rotor to the structure supporting the turbomachine and a compact size.

The low stiffness of the spring bars provides the present invention with a greater range of stiffness and damping characteristics than is available in prior fluid film bearings. In addition, the lower stiffness of the present bearing allows it to adjust to minor height misalignments between bearings and to a skewed rotor shaft. This ability to accommodate height misalignments assists in maintaining uniform loads on multiple bearings and ensures that an adequate hydrodynamic oil film exists within the bearings. Similarly, the bearings are not susceptible to bearing oil whirl instability resulting from lightly loaded bearings.

The present invention provides for a compact journal bearing having spring bars that fit relatively easily within the space required by existing bearings. The circular array of spring bars in the current invention require no external attachments, e.g., bolts, to the bearing support structure. This is in contrast to prior art spring bars that require cumbersome bolts and other attachments to support the damper within the damper. The size of the inventive bearing is comparable to that of existing rigid fluid film bearings. Accordingly, the present bearing is easily adapted as a retrofit bearing for existing bearings, such as rigid fluid film bearings.

In addition, the spring bars of the present invention can be arranged as a circular array encircling the top and lower halves of the rotor. This arrangement provides a symmetrical stiffness characteristic to the bearing. In the alternative, the spring bars can be limited to the lower half of the bearing to provide greater vertical stiffness than horizontal stiffness. This asymmetrical distribution of stiffness reduces the likelihood of aerodynamic whirl instability in the turbomachine. Accordingly, by properly varying the distribution of the spring bars within the bearing the dynamic vibration characteristics of the bearing can be optimized.

The squeeze film dampers in the current invention include plenum chambers filled with oil positioned adjacent the squeeze film region of the bearing. These plenum chambers supply oil to the squeeze film and thin film dampers and ensure that air is not drawn into the oil of the film. The damping capacity of the oil is reduced if air seeps into the oil. Prior art squeeze film dampers allow air to seep through end seals and into the squeeze film. In the present invention, oil filled plenum chambers between the end seals and the squeeze film prevent air seepage. Accordingly, the end seals can be applied to stop oil leakage from the squeeze film and to increase the damping ability of the squeeze film. But, air cannot seep through the seals into the squeeze film. This more effective squeeze film damper further increases the ability of the current invention to dampen vibration from a turbomachine.

BRIEF DESCRIPTION OF THE DRAWINGS

These and other features and advantages of the present invention will become better and more completely understood by referring to the following detailed description of presently preferred exemplary embodiments in conjunction with the sheets of FIGURES, of which.

DETAILED DESCRIPTION OF PRESENTLY PREFERRED EXEMPLARY EMBODIMENTS

Figure 1:
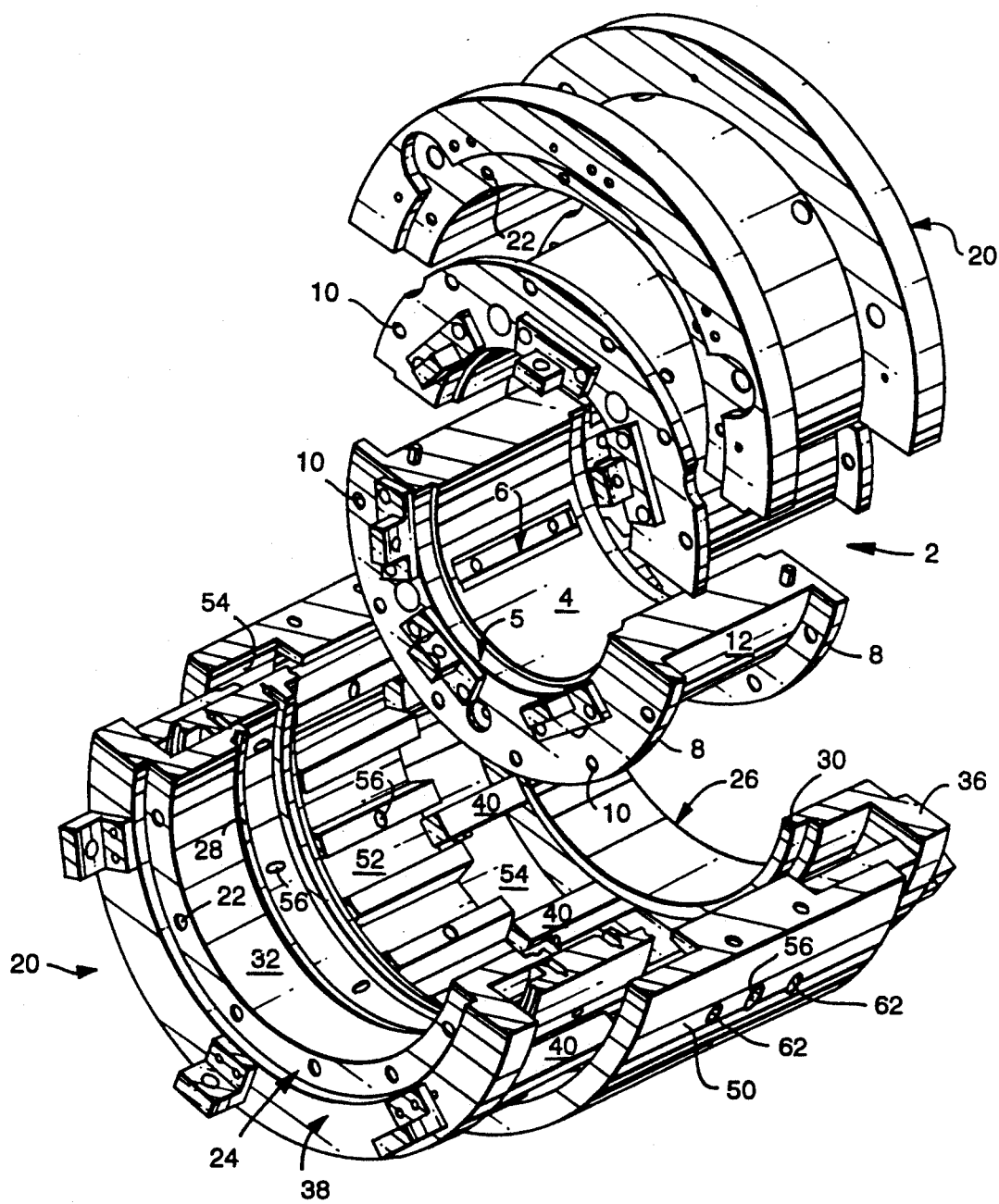
FIG. 1 is a exploded view of the components of one embodiment of the invention.

An exemplary fluid film journal bearing in accordance with the present invention is shown in FIG. 1. A two-piece journal bearing 2 encases the rotor shaft (not shown). The journal bearing has top and bottom halves that fit around the rotor shaft. The journal bearing has an inner cylindrical bearing sleeve 4 having a bearing surface that is immediately adjacent the journal surface on the rotor shaft when the bearing is on the rotor. The bearing surface has an array of recesses 6 that allow fluid for the fluid film to pass through the journal bearing sleeve and into the shallow annular film volume between the bearing surface and the rotor shaft. This fluid forms the fluid film of the fluid film bearing. This fluid film provides a lubricating buffer layer between the metal rotor shaft and the metal journal surface of the bearing. At each side of the bearing surface is a circular channel 5 that receives end seals (not shown) that contain the fluid film to the bearing and rotor shaft.

The non-rotating journal bearing 2 has a pair of annular flanges 8 that support the journal bearing and attach to the bearing spring support 20. These flanges have a circular array of bolt holes 10 that align with a corresponding array of bolt holes 22 in the spring support. Bolts inserted through these holes rigidly fasten the journal bearing to the spring support.

The non-rotating spring support 20 has four interlocking sections. FIG. 1 shows the pair of sections that form the bottom half 24, 26 of the spring support as being separated. Each half of the spring support is composed of a pair of sections 24, 26 that mate together by means of a locking tongue 28 and groove 30 at the lip of the inner cylindrical quarter surface 32 of each section. When assembled, the four quarter surfaces of the spring support form a cylindrical surface that supports the outer periphery 12 of the journal bearing.

Annular flanges 36, 38 at either side of the spring support extend radially outwardly from the inner spring support surface 32. These flanges support the spring support surface and ensure that the spring support does not slide axially with respect to the bearing. Unlike the flanges to the journal bearings, the flanges of the spring support are not fixed to any structure other than the spring support. The flanges are supported by the cantilever spring bars 40 that extend axially from the outer rim of the flanges. The far end 42 (FIG. 2) of each spring bar is seated on the annular stationary ring assembly 50. The spring bars flex when a load is applied to the spring support. This flexing provides the spring bar and spring support with a limited degree of movement within the bearing.

The spring bars are positioned radially outward from the inner surface 32 of the spring support. The bars each have an outwardly extending foot 42 (FIG. 2) at their end farthest from the spring support flange 38. The foot is the only portion of the spring bar that rests on the inner surface of the ring assembly 50. Because of the placement of their feet, the spring bars form cantilever beams that support the spring support within the stationary ring assembly 50.

The spring bars 40 seat within channels 52 milled into the inner surface of the annular stationary ring assembly 50. These channels hold the spring bars and, thus, the spring support 20 in place within the bearing. The channels 52 form a circular array on the inner surface of the stationary ring assembly. Each channel receives a bar from one of the spring support sections. Adjacent channels have spring bars from opposing sections of the spring support. In this way, the load on the stationary ring assembly is balanced across the width of ring assembly. On either side of the channel array is a smooth cylindrical section 54. In addition, the outer cylindrical surface of the ring assembly has ports 56 and 62 that pass the oil for the squeeze film damper and the fluid film bearing. The ring assembly separates into two half-cylindrical sections so that the bearing can be assembled on site around a rotor shaft.

Figure 2:
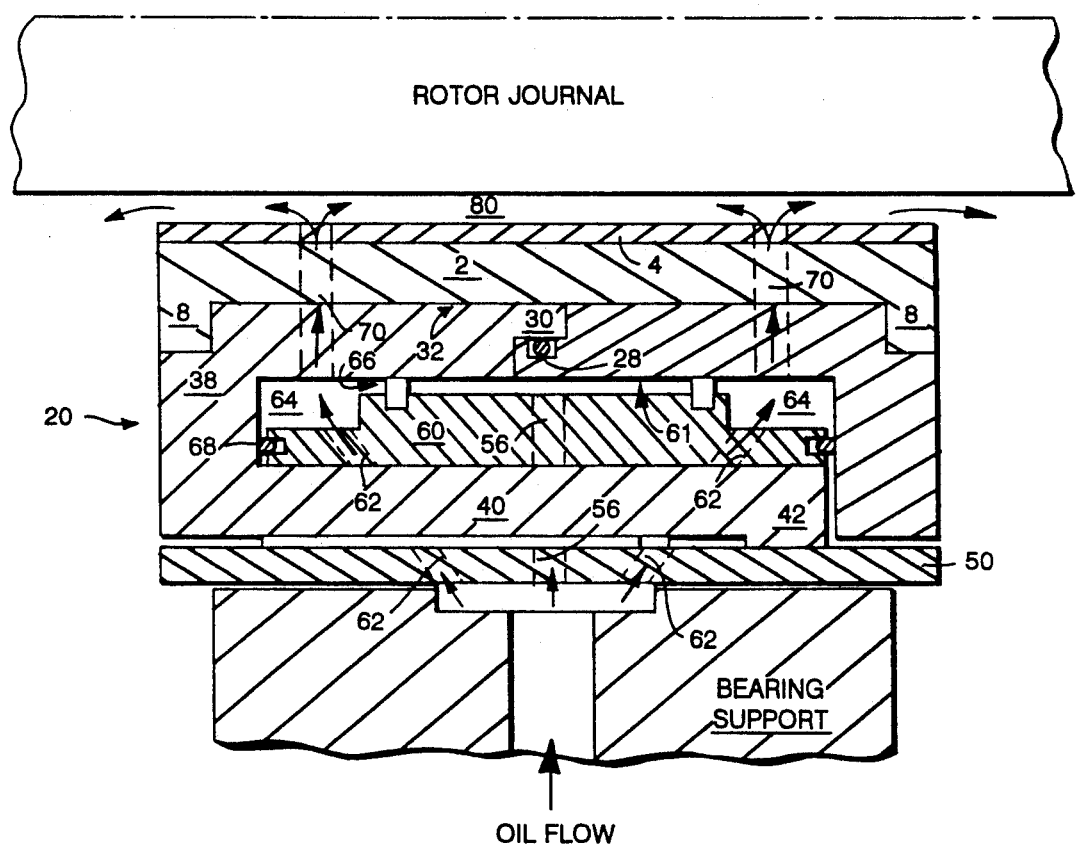
FIG. 2 is a cross-sectional diagram of the embodiment of the invention shown in FIG. 1.

The spring bars are compact. As shown in FIGS. 1 and 2, the bearing spring support has a simple annular shape that contains the spring bars and squeeze film cylinder. The spring bars do not require extraneous components that extend outward from the bearing. In addition, the spring bars do not excessively increase the dimensions of the bearing. Thus, bearings of the present invention can be easily used as retrofit bearings because they fit within the volume of existing bearings.

As is best shown in FIG. 2, a squeeze film cylinder 60 fits within the spring support between the spring bars 40 and the inner spring support surface 32. A fluid squeeze film 61 is formed between the inside surface of the squeeze film cylinder and an inside surface of the spring support. The outer periphery of the squeeze film cylinder is supported by the channel walls 52 of the ring assembly as shown in FIG. 1. The fluid ports 56 of the ring assembly pass fluid directly to the squeeze film 61 through the annular stationary ring assembly 50. Just inside of the squeeze film cylinder are two annular fluid plenums 64 that receive fluid from fluid ports 62. Fluid in these plenums is contained by seals 66 and 68 that seat between the squeeze film cylinder and the spring support 20. These fluid plenums provide a reservoir of fluid that is supplied to a thin oil film 80 surrounding the journal bearing through fluid ports 70 in the spring support and the bearing sleeve. The rotor journal rides on this thin fluid film 80.

The squeeze film 61 acts as a squeeze film vibration damper. The energy adsorbed in forcing oil in and out of the squeeze film dampens vibration. When the bearing spring support flexes with respect to the squeeze film, oil is pushed out or drawn into the squeeze films. The movement of oil in and out of the squeeze film adsorbs energy and, thus, dampens vibration.

Figure 3:
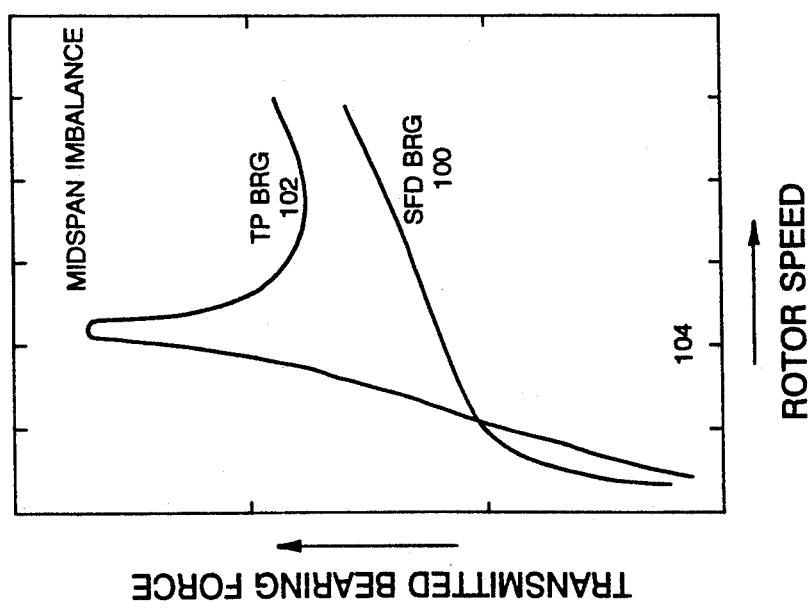
FIG. 3 is a chart comparing the forces transmitted through a journal bearing as a function of the rotational speed of the rotor.

FIG. 3 is a chart of calculated data comparing a squeeze film bearing 100 (SFD BRG) to a conventional tilt pad bearing 102 (TP BRT). This chart establishes that an optimized squeeze film damper bearing attenuates the vibration transmitted through a bearing to a much greater degree than does a tilt pad bearing damper. Especially when the turbomachine rotor speed is near a vibration resonance 104, a squeeze film damper adsorbs much more vibration than do conventional fluid film bearings.

The spring bars and bearing supports of the bearing flex in response to vibration. As shown in FIG. 2, the spring bars seat against the ring assembly at their far end 42 from where they attach to the flange wall 38 of the spring support. Each spring bar forms a cantilevered beam between the ring assembly and the spring support. As with all cantilevered beams, the spring bars bend when a load is applied to the spring support. This bending is used to adsorb vibration by squeezing oil into and out from the squeeze film. The spring bars also flex to move the bearing surface to accommodate slight misalignments between the bearing and the rotor. The flexing of the spring bars to accommodate misalignments ensures that the misalignments do not cause the bearings to be unevenly loaded.

Figure 4:
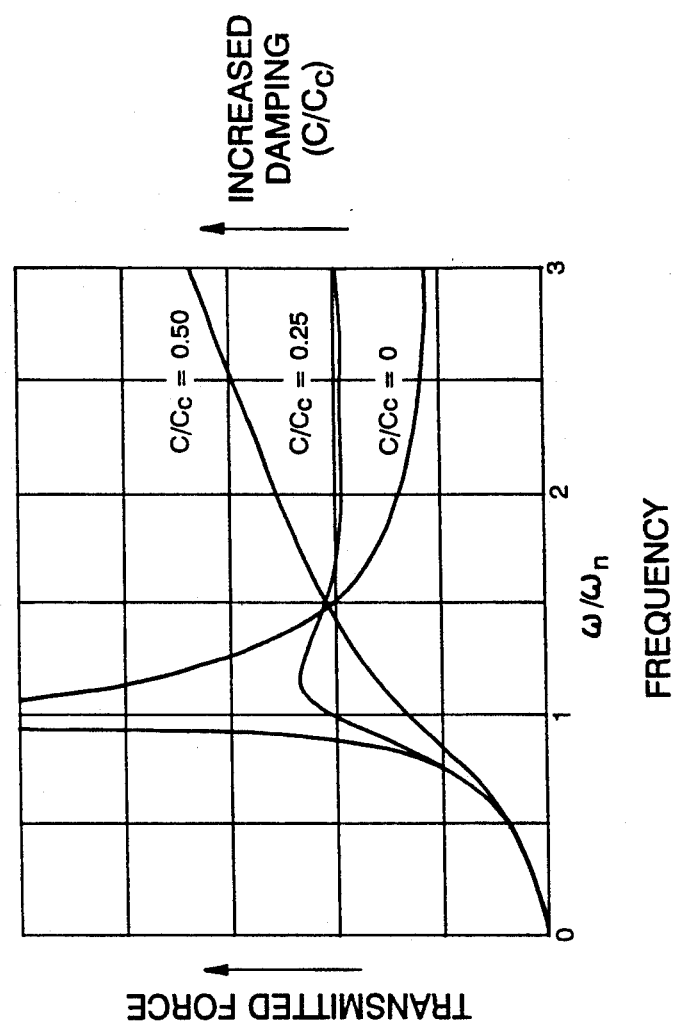
FIG. 4 is a chart comparing the transmitted force through a journal bearing as a function of the normalized excitation frequency for three different bearing damping criteria.

The bending and vibrational characteristics of cantilevered beams are well known. These characteristics are dependent on the length, material and cross-section of the beam. It is relatively straight-forward to tailor these characteristics of the spring bars to the bearing in which they will be used. For example, FIG. 4 shows a normalized chart comparing vibration frequency to transmitted force. If there is no damping, then the force transmitted by the bearing at a resonance node ($\omega/\omega_n = 1$) is extraordinarily great and damaging to the turbomachine. By applying varying amounts of damping ($C/C_c$) with the bearing, the magnitude of the vibration can be dampened to limit the forces transmitted through the bearing. The amount of damping can be optimized for any selected amount of attenuation and to the dynamic vibration characteristics of the turbomachine. Given the well known characteristics of cantilevered beams, the spring bars of the present invention can be designed to provide the optimal amount of damping to suit most turbomachines.

While the invention has been described in connection with what is presently considered to be the preferred embodiment, it is to be understood that the invention is not to be limited to the disclosed embodiment, but is intended to cover various modifications and equivalent arrangements included within the spirit and scope of the appended claims.

What is claimed is:

1. A bearing for a rotatable shaft comprising:
   a journal bearing having a cylindrical bearing surface supporting a journal surface of said shaft,
   a spring support having a cylindrical surface supporting said journal bearing, a plurality of spring bars extending radially outward of said cylindrical surface, and
   a stationary ring assembly around said spring support having an annular inner surface supporting said spring bars.

2. A bearing as in claim 1 wherein said spring support is sectioned into at least two opposing sections each having a plurality of said spring bars, the spring bars of said opposing sections being interleaved and supported by said stationary ring assembly.

3. A bearing as in claim 2 wherein said opposing sections each have a portion of said cylindrical surface and each portion has an interlocking tongue or groove to fasten opposing sections together.

4. A bearing as in claim 1 wherein said stationary ring assembly comprises an annular array of channels receiving said spring bars.

5. A bearing as in claim 4 wherein adjacent channels receive spring bars extending from alternating sides of said spring support.

6. A bearing for a rotor shaft comprising:
   a journal bearing having a cylindrical bearing sleeve supporting a journal surface of said shaft, said bearing having a fluid film between said sleeve and journal surface;
   an annular spring support supporting said journal bearing comprising a cylindrical surface adjacent said journal bearing, flanges extending radially outward from said cylindrical surface and resilient spring bars extending axially from said flanges and positioned radially outward of said cylindrical surface, said spring bars having feet extending radially outward on said bars at a position distant from where the bars attach to said flange; and
   a stationary ring assembly around said spring support and having an inner surface in contact with said feet of the spring bars, said spring support being flexibly mounted within said ring assembly.

7. A bearing as in claim 6 wherein said inner surface of said ring assembly comprises a plurality of channels within which said spring bars extend.

8. A bearing as in claim 6 wherein said spring bars have predetermined flexure characteristics tailored to the vibrational characteristics of a turbomachine.

9. A bearing as in claim 6 further comprising a squeeze film damper comprising squeeze a film cylinder within said spring support between said spring bars and said cylindrical surface, a fluid squeeze film between said squeeze film surface and said spring support and one or more fluid plenums axially adjacent said squeeze film cylinder, said squeeze film cylinder moved by the flexure of said spring bars, movement of said squeeze film cylinder against said squeeze film dampens vibration.

10. A bearing for a rotatable shaft comprising
    a journal bearing having a cylindrical bearing sleeve supporting a journal surface of said shaft, said bearing having a fluid film between said sleeve and journal surface;
    an annular spring support supporting said journal bearing comprising a cylindrical surface adjacent an outer cylindrical surface of said journal bearing, flanges extending radially outward from said cylindrical surface and resilient spring bars extending axially from said flanges and feet positioned radially outward on said bars at a position distant from where the bars attach to said flange; and a stationary ring assembly around said spring support and having an inner surface in contact with said feet of the spring bars, said spring support being flexibly mounted within said ring assembly.

11. A bearing as in claim 10 wherein said inner surface of said ring assembly comprises a plurality of channels within which said spring bars extend.

12. A bearing as in claim 10 wherein said spring bars have predetermined flexure characteristics tailored to the vibrational characteristics of said rotatable shaft.

13. A bearing as in claim 10 further comprising a squeeze film damper comprising a squeeze film cylinder within said spring support between said spring bars and said cylindrical surface, a fluid squeeze film between said squeeze film surface and said spring support and one or more fluid plenums adjacent said squeeze film cylinder, said spring support moved by the flexure of said spring bars, movement of said spring support against said squeeze film dampens vibration.

* * * * *